Dec. 22, 1970  D. F. PECK ET AL  3,549,527
METHOD OF CLARIFYING AQUEOUS SUSPENSIONS
Filed Nov. 14, 1969  4 Sheets-Sheet 1

Inventors
David F. Peck
Thomas J. McBride
Elmer W. Palmer
Douglas A. Schwartz
By Marzall, Johnston, Cook & Root
Attorneys

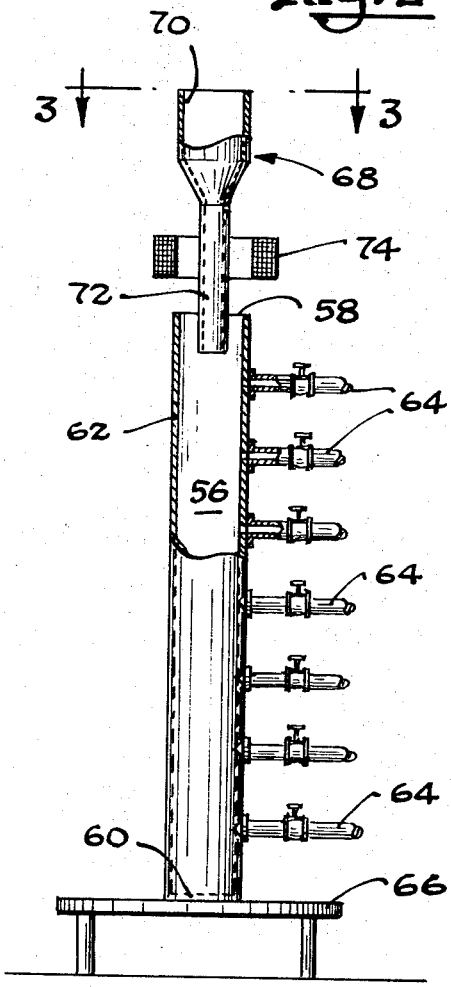
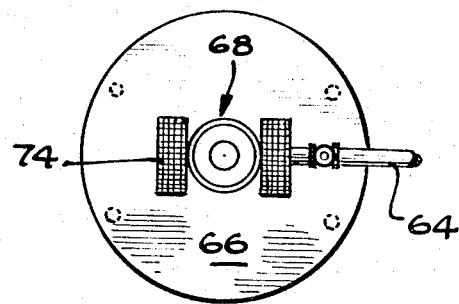

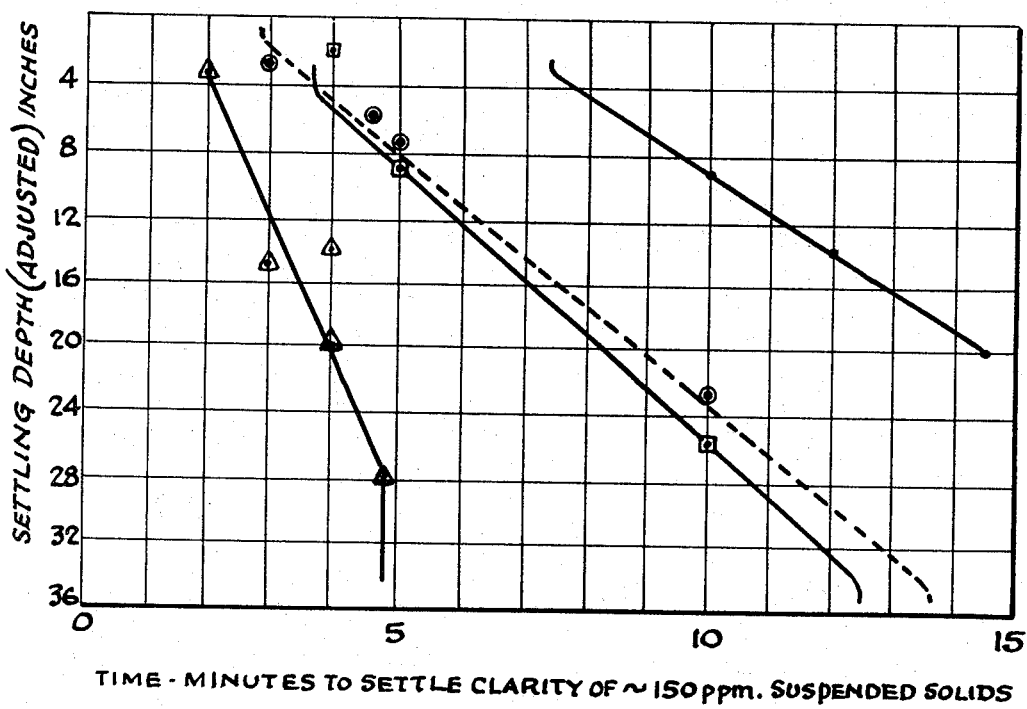

United States Patent Office 3,549,527
Patented Dec. 22, 1970

3,549,527
METHOD OF CLARIFYING AQUEOUS SUSPENSIONS
David F. Peck, Pittsburgh, Pa., Thomas J. McBride, Louisville, Ky., and Elmer W. Palmer, Woodbridge, and Douglas A. Schwartz, Elmhurst, Ill., assignors to Nalco Chemical Company, Chicago, Ill., a corporation of Delaware
Continuation-in-part of application Ser. No. 739,569, June 24, 1968. This application Nov. 14, 1969, Ser. No. 876,723
Int. Cl. C02b *1/20*
U.S. Cl. 210—54
8 Claims

ABSTRACT OF THE DISCLOSURE

Aqueous fluid suspensions, the suspended phase of which is composed of particles which are susceptible in varying degree to magnetic polarization, are readily clarified by using anionic water-soluble polymers in combination with a magnetic field.

---

This is a continuation-in-part of the copending application, U.S. Ser. No. 739,569, filed June 24, 1968, now abandoned.

INTRODUCTION

The manufacture and processing of steel produces a variety of waste products. Several of the wastes produced by steelmaking operations are aqueous suspensions of finely-divided iron oxide particles. Suspensions of this type result from the water scrubbing of gases emitted during the conversion of iron-containing materials into steel and steel alloys, and from other operations.

A typical steelmaking process, which produces aqueous suspensions of finely-divided iron oxide, is the basic oxygen furnace process (BOF). In this process a molten bath of iron is top blown on its surface with oxygen at a high velocity. This technique, while allowing the rapid transformation of iron into steel, generates waste gases, containing large quantities of iron oxide particles. These particles are spewed forth from the top of the vessel. It is customary to collect the particles by means of collecting systems which may be of the electrostatic type or wet scrubbing technique. The effluents from the wet collection scrubbing processes are aqueous suspensions of finely-divided iron oxides. Similarly, the electrostatic method results in an aqueous suspension of like particles since the top gas is spray cooled prior to entering the precipitator. These suspensions are extremely difficult to treat for purposes of removing the suspended matter from the aqueous phase, and thus rendering the effluent suitable for recycle or discharge.

Similar suspensions of iron oxide particles are produced from the collection of flue dust wastes from electric furnaces and open-hearth furnaces. Also finely-divided suspensions of iron oxides result from steel processing operations, such as strip mill descaling operations and the like. Other suspensions of finely-divided particles containing iron which are removed from the atmosphere incident to steel processing operations are illustrated by aqueous slurries of such materials as blast furnace dust, roll scale, dust from Bessemer convertor operations, sintering dust, blast furnace slag particles and iron ore roasting dusts. These materials when collected in various types of wet dust collecting systems, produce aqueous suspensions of various types of iron oxides, substantially free from organic matter other than present in the waste water. These are separated with difficulty from the aqueous phase. The resultant clear effluent may be recycled or discharged to the receiving stream. The recovered iron containing fines are put back into the steelmaking process.

One of the most important factors contributing to the high degree of difficulty encountered in removing these water suspended dusts is the particle size of the dust particles. Microscopy of these particles reveals that many of these finely-divided dusts have ultimate particle sizes less than 35 microns in at least one dimension and in many cases, the ultimate particle sizes of these particles are of a magnitude such that at least one dimension is within the range if 0.1–10 microns.

In order to render suspensions of the above type suitable for recycle or disposal into disposal systems, bodies of water or other waste disposal areas, it is necessary that the finely-divided suspended phase of these suspensions be removed from the aqueous phase. Until the present invention, it has been customary to treat these suspensions by means of conventional thickening and sedimentation techniques whereby the suspended material is flocculated and settled and the aqueous phase then separated therefrom.

Conventional clarification techniques when used to treat these suspensions are not entirely satisfactory. In general, these suspensions require extremely long settling periods for the suspended iron oxide particles to separate from the aqueous phase. Furthermore, the removal of the finely-divided iron oxide particles is not complete, the result being that the effluent produced from such processes is not suitable for subsequent disposal into municipal sewage systems or watercourses.

In an effort to overcome deficiencies of the types described, investigators have turned to synthetic coagulants in an effort to improve the removal of fine particles from aqueous suspensions. In recent years, these suspensions have been clarified by using synthetic organic water-soluble polymers, generically known as polyelectrolytes. While these synthetic coagulants improved the removal of finely-divided iron oxide from aqueous suspensions thereof, there is room for further improvement in the treatment of such slurries.

Typical steel mill wastes of the type described represent extremely large volumes of fluids to be acted upon by synthetic coagulants. Therefore, to be truly effective, the coagulant must work at low economical dosages. In certain large volume operations if the dosage of the synthetic coagulant exceeds a few parts per million costs for treating the entire system becomes prohibitive.

A proposed method for clarifying suspensions of the type described relies on the use of magnetism for agglomerating, settling and removing suspended iron oxide particles from aqueous suspensions. A discussion dealing with the use of magnetic forces to remove suspended iron oxide particles from aqueous suspension appears in the British Pat. 592,324 (1947). Another summary of the use of magnets for treating various types of suspension appears in Industrial Water Engineering, February, 1968 in the article by H. C. Bramer entitled "Magnets in Waste Water Treatment." Magnetic phenomena for purposes of removing solids from organic suspensions are also discussed in Canadian Pat. 731,212 and are mentioned in Blaisdell, U.S. 3,142,638. In the processes described above, magnetic fields are generally used to enhance the removal of suspended organic solids such as are found in sewage treatment operations. In treating such systems, small amounts of ferro-magnetic particles are admixed with an aqueous suspension of organic matter and magnetism is used to remove the magnetic particles, to which the other suspended matter is said to have been occluded. The magnetic particles are added to the systems for purposes of weighting the floc formed and as a particle nucleating agent. The main thrust of such proposals is that magnetic particles, when added in small amounts, aid in producing a flocculated mass which contains sufficient magnetic particles to be made susceptible to subsequent removal by sedimentation occasioned by exposing such systems to a magnetic field.

The use of magnetic fields as described above should be distinguished from the use of magnetic forces to treat aqueous suspensions the suspended phase of which is composed primarily of inorganic particles. In such systems where the suspended phase is paramagnetic, magnetic fields have shown some effect in flocculating these systems without the addition of other materials.

Paramagnetic particles of the types described are also susceptible to coagulation by synthetic coagulants. It has been the experience of the art, however, that when the synthetic coagulants are used to treat suspensions of finely-divided paramagnetic materials, the flocs formed have insufficient weight to surface ratio to allow rapid settling.

OBJECTS OF THE INVENTION

It is an object of the invention to provide an improved method for clarifying aqueous fluid suspensions the suspended phase of which is composed predominantly of finely-divided particles susceptible to magnetic polarization and contain little or no organic material.

Another object of the invention is to provide an improved method for clarifying aqueous suspensions of finely-divided iron oxide dusts of the type produced by the manufacture of steel, particularly those dusts resulting from the BOF process or the electric furnace process.

A specific object of the invention is to provide a method of treating suspensions of the type described herein using a combination of certain synthetic coagulants with magnetic forces whereby more efficient and complete removal of iron oxide particles suspended in aqueous fluids is achieved. Other objects will appear hereinafter.

THE INVENTION

The invention comprises clarifying aqueous fluid suspensions the suspended phase of which is composed predominantly of finely-divided particles susceptible to magnetic polarization by employing the following steps:

(1) Uniformly admixing with such suspensions from 0.01 up to about 100 p.p.m. of an anionic water soluble polymer formed by the polymerization of at least one mono-olefinic compound through an aliphatic unsaturated group. These polymers are further characterized as having a molecular weight of at least 100,000;

(2) Subjecting the thus polymer treated suspension to a magnetic field having a flux density of at least 10 gauss whereby the particles are magnetically polarized and coalesced into large agglomerated floc particles capable of rapidly settling; and (3) Separating the flocculated particles from the aqueous fluid.

THE AQUEOUS FLUID SUSPENSION

The aqueous fluid suspensions upon which the invention operates contain as a suspended phase finely-divided particles which are paramagnetic. Suspensions of this type are found as a result of steel mill water scrubbing operations where iron oxide dusts are removed from the atmosphere and from steel processing areas by means of water scrubbing. Typical aqueous suspensions of the type described are the iron oxide dusts removed from the BOF process by water scrubbers or by water washing of collected materials from electrostatic precipitators.

The iron oxide particles contained in BOF dust contain substantial quantities of magnetite ($Fe_3O_4$). Under intensive magnification, it is observed that these dust particles are of extremely fine dimension when in an unaggregated state. Their ultimate particle size is approximately 1 micron in diameter.

Other typical dusts collected in the form of aqueous suspensions from steel mill wastes include blast furnace dust which usually contains about 40% of red iron oxide grains having an average particle size diameter of less than 2 microns, and finely-divided open-hearth combustion dust which is similar in size and composition to BOF dust.

Another dust commonly collected in aqueous scrubbing systems is derived from electric furnace fumes containing iron oxide crystals having a particle size range varying between 2–3 microns. Other common ferromagnetic particles include mill scale dust, ferromanganese dust, certain mill scales and ferro-silicon dust. These substances are all found in certain mills where they are removed from the atmosphere and production areas by means of aqueous scrubbing or washing techniques. They usually contain at least 10% by weight of ferromagnetic species of iron oxide, e.g. magnetite or alpha ferric oxide whereby they are considered as being paramagnetic as a total mass for purposes of this invention.

Suspensions of the type described above contain from as little as 10 p.p.m. up to as much as 30% by weight of suspended iron oxide particles which are settled with difficulty. The particles in these suspensions for purposes of further characterization are in the form of ultimate particles whose size is at least 35 microns in at least one dimension. In most cases the ultimate particle size is within the range of 0.1 to 10 microns. In some cases the ultimate particles are aggregated into larger size particles, but in most cases at least 10% of the particles are unaggregated and are within the dimensions specified.

While the invention is primarily directed to treating aqueous iron oxide suspensions of the types described above, the invention has been found applicable to treating other aqueous suspensions where ferromagnetic particles are present in a portion of the suspended phase. It may be said that the invention is particularly directed to treating aqueous suspensions of finely-divided ferromagnetic particles where at least 20% of the suspension is composed of materials evidencing ferromagnetic characteristics.

Illustrative of other ferromagnetic suspensions which may be treated in accordance with the concepts shown herein whereby improved clarification is achieved are aqueous suspensions containing such ferromagnetic substances as the oxide or elemental forms of such metals as cobalt, nickel, and the like. Also included are aqueous suspensions of ferrimagnetic substances such as peroffkite, certain tungsten alloys, which substances under proper conditions of temperature are sufficiently magnetically active to be susceptible to treatment. The invention therefore contemplates treating aqueous suspensions of finely-divided particles, which are susceptible in lesser or greater degree to magnetic polarization.

The invention is capable of treating aqueous suspensions of finely-divided paramagnetic particles where the amount of such particles ranges from as little as 10 p.p.m. and includes suspensions which contain up to 30% by weight. While no particular concentration ranges may be given for all these suspensions, upon which the invention operates, it may be said generally that excellent results have been observed when the suspensions contain between 100 p.p.m. up to 20% by weight of finely-divided paramagnetic particles.

THE ANIONIC WATER SOLUBLE POLYMERS

The anionic water soluble polymers used in the practice of the invention are formed by the polymerization of at least one mono-olefinic compound through an aliphatic unsaturated group. The polymers may be either copolymers or homopolymers and should have a minimum molecular weight of at least 100,000. In a preferred practice of the invention, the molecular weight of these polymers is at least 1 million with molecular weights in excess of 1 million also being suitable for use. In most cases the upper practical molecular weight limit is about 30,000,000.

The anionic water soluble polymers of the type generically described are composed of at least 10% by weight of at least one monomer which contains an anionic hydrophilic side chain group. Thus the polymers may be said to contain in a side chain grouping such anionic radicals as carboxylic acid, carboxylic anhydride groups, carboxylic acid salt groups, sulfonic acid groups, phosphonus and phosphonic acid and salt groupings.

The most readily prepared polymers that give the best results are the copolymers and homopolymers of acrylic acid which contain at least 10% by weight of acrylic acid or acrylic acid salts.

A particularly useful group of copolymer of acrylic acids are those which contain 20–60% by weight of acrylic acid, and from 40–80% by weight of acrylamid with such polymers having a preferred molecular weight range between 1–3 million. To illustrate preparation of a typical polymer of acrylamid and acrylic acid, the following is presented by way of example.

EXAMPLE I

This example illustrates preparation of a copolymer comprised of 30% sodium acrylate monomer and 70% acrylamide.

Twenty-seven (27) parts by weight of acrylic acid was dissolved in 72 parts of water and cooled to a temperature below 35° C. The above solution temperature was maintained while neutralization with sodium hydroxide was effected. Addition of 30 parts by weight of a 50% solution of sodium hydroxide was necessary to carry out this step. A solution pH of 7–9 was reached after neutralization.

Sixty-three (63) parts by weight of acrylamide were then added to the above solution and mixed until dissolved at a solution temperature of 20–30° C. Thirty-three (33) additional parts by weight of water were added and the pH of the monomer solution adjusted to 8.5. 0.8 part of a 1% solution of potassium persulfate were added with stirring to the monomer solution. This was followed by addition of 3.2 parts of a 1% solution of sodium metabisulfite. Into the reaction vessel itself was added 575.0 parts by weight of toluene and 19.6 parts by weight of sorbitan monooleate nonionic emulsifier. To the toluene solution was added the monomer solution containing catalyst and the temperature increased to 75° C.

The reaction vessel was purged with nitrogen and an exothermic reaction was then initiated. After the exothermic reaction ceased, the mixture was cooled at 63° C., and additional catalyst added. Specifically, 15.6 parts of a 1.15% solution of azobisisobutyronitrile in toluene were added to the reaction mixture. The nitrogen purge was continued and the temperature held at 63° C., until another exothermic reaction was completed (approximately 30 minutes after initiation). After the second exothermic reaction, water was distilled off by azeotropic distillation, and the solid product isolated by filtration. A 1% solution of the final copolymeric composition had a viscosity of 22,500 cps. The molecular weight of this polymer was slightly greater than 1,000,000.

Thus, the preferred polymers of the invention are prepared from monomers having the molecular grouping:

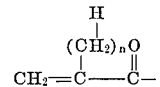

wherein $n$ is an integer from zero (0) to one (1) inclusive.

Another useful group of polymers of anionic copolymers whose starting monomers contain the grouping:

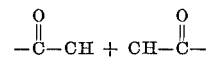

Illustrative of such polymers are copolymers of maleic anhydride, maleic acid fumaric acid, itaconic acid, aconitic acid, citraconic acid, the partial amides of these acids, the alkali metals (e.g. sodium, potassium and lithium), the alkaline earth metals (e.g. magnesium, calcium, barium and strontium), and ammonium salts of these acids, the partial alkyl esters (e.g. methyl, ethyl, propyl, butyl, mono esters), the salts of said partial alkyl esters, and the partial substituted amides of these polycarboxylic acids. Where the hydrophilic maleic acid derivatives are used as one of the starting components to form the copolymer, the hydrophobic comonomers may be, for example, styrene, alphamethylstyrene, vinyl toluene, chlorostyrene, vinyl acetate, vinyl chloride, vinyl formate, vinyl alkyl ethers, alkyl acrylates, alkyl methacrylates, ethylene, propylene, and/or isobutylene.

Other polymers that may be employed are those polymers which contain in a side chain grouping, a sulfonic phosphonic or phosphonus acid grouping, either as the free acid or in the form of a water-soluble cation salt. Illustrative are the well known polystyrene sulfonic acids. Also illustrative are the phosphorolated polystyrenes.

In certain instances it is possible to use homo or copolymers of acrylamides which are not, per se, anionic, but under certain conditions of pH as will be more fully described hereinafter, are capable of being hydrolyzed to convert the amide grouping into a carboxylic acid salt grouping, thereby rendering the starting polymer anionic under conditions of use.

To further illustrate typical polymers useful in the practices of the invention, Table I is presented below:

TABLE I

| Number: | Name | Characteristic grouping |
|---|---|---|
| 1 | Polyacrylate-sodium salt | $-CH_2-CH-$<br>$\phantom{-CH_2-}|$<br>$\phantom{-CH_2-}COO\ (-)$<br>$\phantom{-CH_2-C}Na\ (+)$ |
| 2 | Polymethacrylic acid-sodium salt | $\phantom{-CH_2-}CH_3$<br>$\phantom{-CH_2-}|$<br>$-CH_2-C-$<br>$\phantom{-CH_2-}|$<br>$\phantom{-CH_2-}COO\ (-)$<br>$\phantom{-CH_2-C}Na\ (+)$ |
| 3 | Maleic anhydride-vinyl acetate copolymer | $-CH-CH_2-CH-\!\!-\!\!-CH-$<br>$\phantom{-}|\phantom{-CH_2-CH}|\phantom{--}|$<br>$\phantom{-}O\phantom{-CH_2-}O=C\phantom{-}C=O$<br>$CH_3C=O\phantom{-CH_2-CH-}\diagdown\phantom{-}\diagup$<br>$\phantom{-CH_2-CH_2-CH-CH-}O$ |
| 4 | Polyvinyl methyl ether-maleic anhydride copolymer | $-CH-CH_2-CH-\!\!-\!\!-CH-$<br>$\phantom{-}|\phantom{-CH_2-CH}|\phantom{--}|$<br>$OCH_3\phantom{-}O=C\phantom{-}C=O$<br>$\phantom{-CH-CH_2-CH-CH}\diagdown\phantom{-}\diagup$<br>$\phantom{-CH-CH_2-CH-CH-C}O$ |
| 5 | Methacrylic acid-acrylamide copolymer | $\phantom{-}CH_3\phantom{-CH_2-}CH_3$<br>$\phantom{-}|\phantom{-CH_2-CH_2-}|$<br>$-CH_2C-CH_2-C-$<br>$\phantom{-CH_2-C-CH_2-}|$<br>$\phantom{-CH_2-C-CH_2-}CONH_2$<br>$\phantom{-}COO\ (-)$<br>$\phantom{-CH_2}H\ (+)$ |

TABLE I.—Continued

| Number | Name | Characteristic grouping |
|---|---|---|
| 6 | Polyacrylic acid | $-CH_2-CH-$ <br> $\quad\quad\quad\, \mid$ <br> $\quad\quad\quad COO\,(-)$ <br> $\quad\quad\quad\,\, H\,(+)$ |
| 7 | Isopropenyl acetate-maleic anhydride sodium salt. | $\quad\quad\quad\, CH_3$ <br> $CH_2-C\!-\!-\!-\!CH\!-\!-\!-\!CH$ <br> $\quad\quad\,\, \mid\quad\quad\quad \mid\quad\quad\,\, \mid$ <br> $\quad\quad\,\, O\quad\quad\, C\!=\!O\,\,\, C\!=\!O$ <br> $CH_2C\!=\!O\,\,\, O\,\,(-)\,\,\, O\,\,(-)$ <br> $\quad\quad\quad\quad\,\, Na\,(+)\,\, Na\,(+)$ |
| 8 | Itaconic acid-vinyl acetate | $\quad\quad COO(-)H(+)$ <br> $\quad\quad\quad \mid$ <br> $-C-CH_2-CH_2-CH-$ <br> $\quad\,\, \mid\quad\quad\quad\quad\quad\quad\, O$ <br> $CH_2COO\,\,(-)\quad \mid$ <br> $\quad\quad\quad\, H\,(+)\,\, CH_3C\!=\!O$ |
| 9 | Methyl styrene-maleic anhydride sodium salt. | $CH_3$ <br> $\mid$ <br> $C-CH_2-CH\!-\!-\!-\!CH-$ <br> $\quad\quad\quad\,\, \mid\quad\quad\quad\quad \mid$ <br> $\quad\quad\quad COO(-)\,\,\, COO(-)$ <br> $\quad\quad\quad\,\, Na(+)\quad\,\, Na\,(+)$ <br> (phenyl ring) |
| 10 | Styrene-maleic anhydride | $-CH-CH_2-CH\!-\!-\!-\!CH-$ <br> $\quad\quad\quad\quad\quad\,\, \mid\quad\quad\quad\, \mid$ <br> $\quad\quad\quad\quad COO\,(-)\,\, COO\,(-)$ <br> $\quad\quad\quad\quad\, Na\,(+)\quad\,\, Na\,(+)$ <br> (phenyl ring) |
| 11 | Methylmethacrylate-maleic anhydride sodium salt. | $\quad\quad CH_3$ <br> $\quad\quad\, \mid$ <br> $-C\!-\!-\!-\!-\!CH_2-CH\!-\!-\!-\!CH-$ <br> $\,\,\, \mid\quad\quad\quad\quad\quad\,\, \mid\quad\quad\quad \mid$ <br> $COOCH_3\quad\,\, COO\,(-)\,\, COO(-)$ <br> $\quad\quad\quad\quad\quad\, Na\,(+)\quad\, Na(+)$ |
| 12 | Acrylic acid-styrene | $-CH-CH_2-CH-CH_2$ <br> $\quad\quad\quad\quad\quad\,\, \mid$ <br> $\quad\quad\quad\quad\,\, COO\,(-)$ <br> $\quad\quad\quad\quad\,\,\,\, H\,(+)$ <br> (phenyl ring) |

Also see the disclosures and discussions of anionic polymers appearing in U.S. 3,377,274 and U.S. 3,374,143 which are incorporated herein by reference.

The polymers of the invention are most suitably used in the form of dilute aqueous solutions whose solution strength ranges between 0.1%–5% by weight. Such solutions are prepared in mixing vessels and then used to treat the aqueous suspensions described.

The polymers are used at a dosage within the range of 0.01 part per million up to dosages not greater than 100 parts per million. In most cases excellent results are obtained when the dosage of the polymer is within the range of 0.05 to 5 parts per million. The dosage levels specified are based on the total system rather than upon the suspended solids present in the system.

THE USE OF MAGNETISM

The magnets may be either of a permanent or electromagnetic type. In a preferred embodiment of the invention, permanent magnets are used whose flux density is at least 10 gauss. It is desirable to use magnets having a gauss rating in excess of 100 gauss. Most preferred are the employment of a permanent magnet whose flux density is as great at 1000 gauss.

The magnet may be in the form of a conventional horseshoe, bar, or toroid depending upon how the magnet is used to treat the aqueous suspension of the magnetically polarizable particles. In certain instances, it may be desirable to employ a number of permanent magnets whereby a magnetic field of sufficient density is present to act upon the suspended particles. It is important to the practice of the invention that the suspension acted upon by the magnet intersect the lines of force whereby the particles are polarized by the action of the field.

The most common application of magnetism in practicing the invention is that of flowing the polymer-treated suspension through a magnetic field generated by a magnet or magnets surrounding a pipe or similar fluid conductor. If the fluid conductor is of magnetically susceptible material, it is necessary that the flow rate of the aqueous suspension be sufficiently rapid so as to insure that no buildup of magnetized particles within the pipe occurs due to the action of the magnetic field. The flow rate must, however, be sufficiently slow so as to allow magnetic alignment of the magnetizable particles as they pass through the field. The exact velocity of the suspension required to meet the above standards is best determined by plant site or laboratory experimentation. It may be stated as a generalization, however, that the flow rate of the suspension within a fluid conductor about and in which there has been generated the magnetic field should not exceed a Reynolds number of 27,000.

pH

When the suspensions treated contain magnetic iron oxide as the suspended phase, it has been discovered that optimum results are achieved when the pH of the system is at least 8. The pH of the suspension should be usually not greater than 12 and preferably is within the range of 8.5–11.5. In a preferred practice of the invention, it is, therefore, desirable that the pH of the suspension be adjusted to within these ranges. It is to be understood, however, that if the particular suspension treated is already within these pH ranges then, for purposes of the invention, it is considered that the pH has been or is adjusted. It will also be understood that the invention performs satisfactorily even at pH's lower than 5.0.

TEMPERATURE

Although temperature is not critical to the success of the invention, it has been further discovered that optimum results are achieved in clarifying aqueous suspension of magnetic iron oxides, such as suspensions of BOF dust, when the temperatures of such suspensions are within the range of 50–150° F. A preferred temperature range is 70–140° F. These temperatures are not critical since the invention is effective over even wider temperature ranges. However, where it is not unduly difficult to adjust the temperatures within the ranges specified, such adjustment brings about optimum results. For a more comprehensive understanding of the invention, reference is now made to the drawings.

THE DRAWINGS

FIG. 2 is an elevation view, broken away in part, of a small scale test apparatus for evaluating polymers in conjunction with magnets for the purpose of removing finely-divided ferromagnetic particles from aqueous suspensions;

FIG. 3 is a plan view of FIG. 2;

FIG. 4 is isometric settling curves of an aqueous suspension of BOF dust which has been treated with a water soluble anionic polymer, a magnet, with the combination of the anionic polymer and a magnet, and, for comparison, a curve of an untreated suspension;

Figure 1:
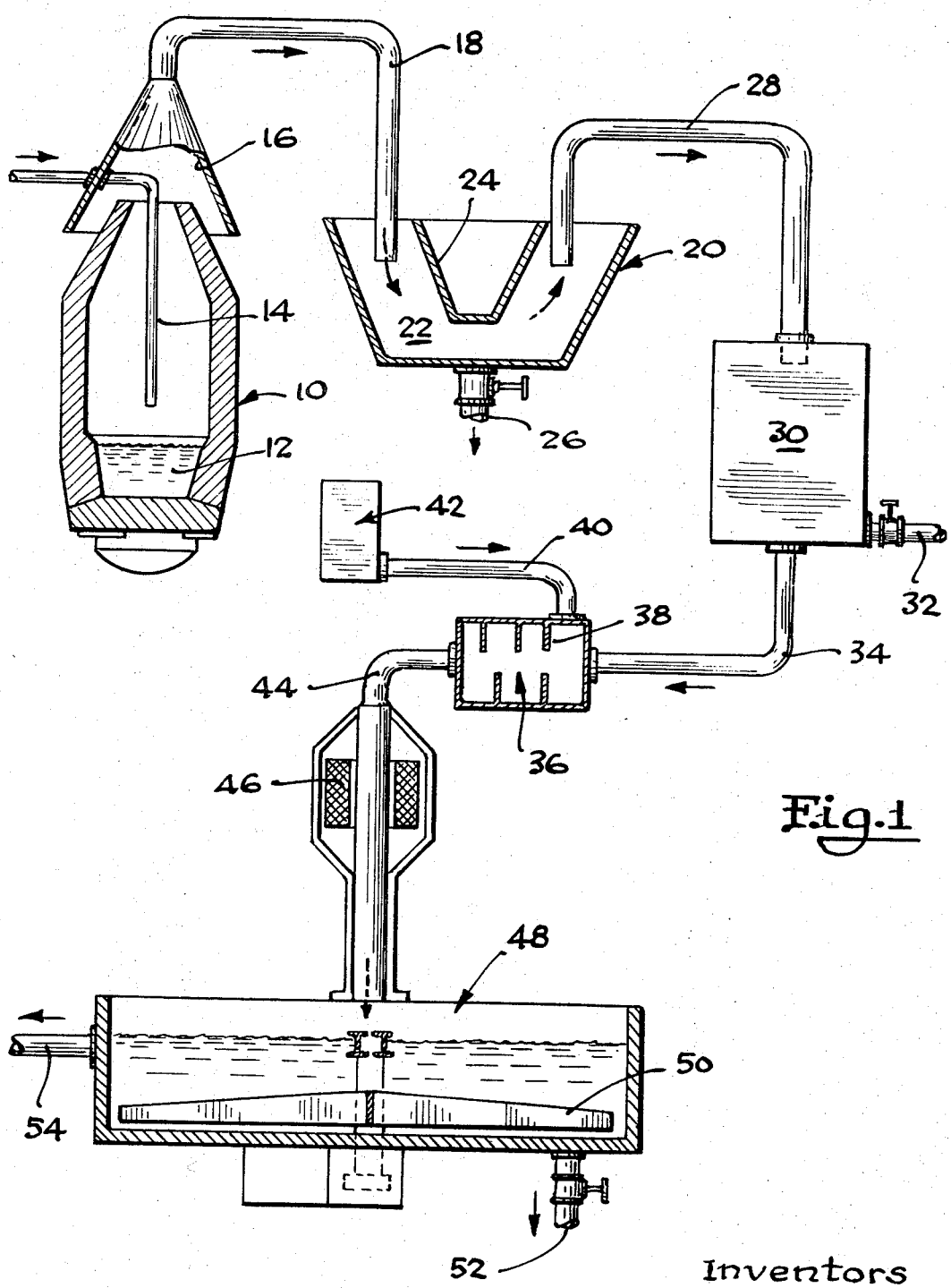
FIG. 1 is a simplified schematic elevation view of a BOF steel-making operation, including a wet dust collecting system coupled with a polymer feed system and a magnetic device for removing suspended solids.

With specific reference to the drawings, and in particular FIG. 1, there is shown a basic oxygen furnace or vessel 10 which contains molten steel 12 at its bottom. Positioned within the vessel through its mouth is an oxygen lance 14 supplied by an oxygen source not shown.

Over the top of vessel 10 is a dust collector hood 16 shown in the drawing to be of conical shape. Oxide particles and gases produced in vessel 10 are picked up by the dust collector 16 and transmitted through line 18 into a spark box 20 which is shown as having an inner chamber 22 defined by inverted truncated cone baffle 24 and the outer walls of the spark box. This combination of elements provides a reversal of gas flow from line 18. Gas and particles delivered through line 18 into spark box 20 deposit large iron oxide particles within the spark box where they are removed through grit disposal line 26.

Finer particles are swept through the spark box and into a wet scrubber 30 by means of conduit 28 where they are washed with quantities of water thereby producing an aqueous slurry of finely-divided iron oxide in water. Purified air is vented through the scrubber through line 32 to the atmosphere.

The aqueous suspension of finely-divided iron oxide particles produced in wet scrubber 30 is transmitted therefrom through line 34 into a line mixing device 36 which is shown to contain a plurality of baffle members 38. Connected to mixing device 36 near its inlet is a polymer solution feed line 40 which supplies water soluble anionic polymer which is made up and stored in polymer feed tank 42. The polymer entering the mixing baffle through line 40 uniformly admixes with the aqueous slurry entering the mixing device through line 34.

The thus polymer treated slurry is transferred from mixing device 36 through line 44 where it is subjected to a magnetic field supplied by one or more magnets 46 which are positioned around line 44.

The polymer-magnetically treated slurry is then discharged from line 44 into a conventional clarifier 48 which employs a rake arm device 50, and allows the suspension to be separated into its aqueous phase and into a solidly packed sludge phase which is removed from the clarifier through line 52. The clarified aqueous phase is withdrawn through line 54. The underflow phase from line 52 is recovered for reuse in the steelmaking processes.

From the above, it is evident that the aqueous suspension produced in the wet scrubber 30 is sequentially treated with an anionic water soluble polymer and then is subjected to a magnetic field, which combination produces an improved clarification of the slurry.

It will be understood that the elements and devices shown in FIG. 1 are illustrative only of how the invention may be practiced. For instance, in BOF dust collecting systems it is not uncommon to subject BOF top gases to an electrostatic precipitator to remove the finely-divided dust particles. After the precipitator becomes sufficiently full of dust particles, it is common to water wash such precipitators to keep the electrostatic surfaces available for additional dust collection. Also, the latest BOF installations employ so-called "evaporation chambers" instead of spark boxes, whereby, the hot top gases are spray cooled prior to entering the electrostatic precipitator. The aqueous effluents from such washing operations contain suspensions of iron oxide particles which are susceptible to the treating practices of this invention.

EVALUATION OF THE INVENTION

In order to test the invention, the test apparatus shown in FIGS. 2 and 3 was employed. FIG. 2 represents a vertically disposed plastic cylinder 56 having a top 58, a bottom 60 and side walls 62. Positioned vertically along side walls 62 are a plurality of horizontally disposed valved outlets 64 arranged along the vertical length of the plastic cylinder 56 in parallel spaced apart relationship. The plastic cylinder for convenience is mounted on a suitable base 66. At the top 58 of the plastic cylinder 56 there is mounted a funnel 68 havig an inverted cone top 70 and an elongated neck 72 which feeds into the top 58 of plastic cylinder 56. Fitted around the neck of the funnel is a permanent magnet 74 which provides lines of force parallel to the top 58 of plastic cylinder 56.

For the tests herein described the particular cylinder used was 4 feet high and held approximately 5 gallons of liquid. The procedure used provided for the introduction of the prescribed amount of a sampled BOF wet scrubber dust slurry into the cylinder with the height of the liquid in the cylinder being observed. At various prescribed time intervals, samples were drawn from all the outlets 64 simultaneously. These samples were tested by conventional laboratory techniques for suspended solids.

The data obtained were then plotted to provide an isometric settling curve to show graphically the varying time intervals necessary to obtain a desired parts per million clarity level at any prescribed depth for the various treatments used.

Using the above test procedure, four separate tests were conducted. The first test was an untreated sample allowed to settle by gravity only. The second test utilized 0.5 p.p.m. of the polymer described in Example I. The third test used the magnet only without prior polymer treatment. The final test consisted in treating the suspension with 0.5 p.p.m. of the polymer and then subjecting the thus treated suspension to the field of the magnet, which was rated at 750 gauss. The pH of the slurry was greater than 8. The slurry contained about 1.2% solids. The slurry temperature was 70° F.

The results of these tests are set forth in FIG. 4. The combination of anionic polymer plus a magnetic field shows that the time to settle the suspended solids of the slurry to a depth of 28 inches (obtaining a supernatant clarity of 150 p.p.m. or less) was 4.8 minutes. The magnet alone required 10.5 minutes and the polymer alone, 11.3 minutes. The improvement was greater than doubled by the rise of the combination treatment, thus demonstrating the marked synergistic effect inherent in this invention.

EXAMPLE II

The spray water effluent from an operational electric furnace was treated with the polymer of Example I.

Treatment was carried out in the same manner as was outlined in Example I for the treatment of the effluent from a basic oxygen furnace.

Figure 5:
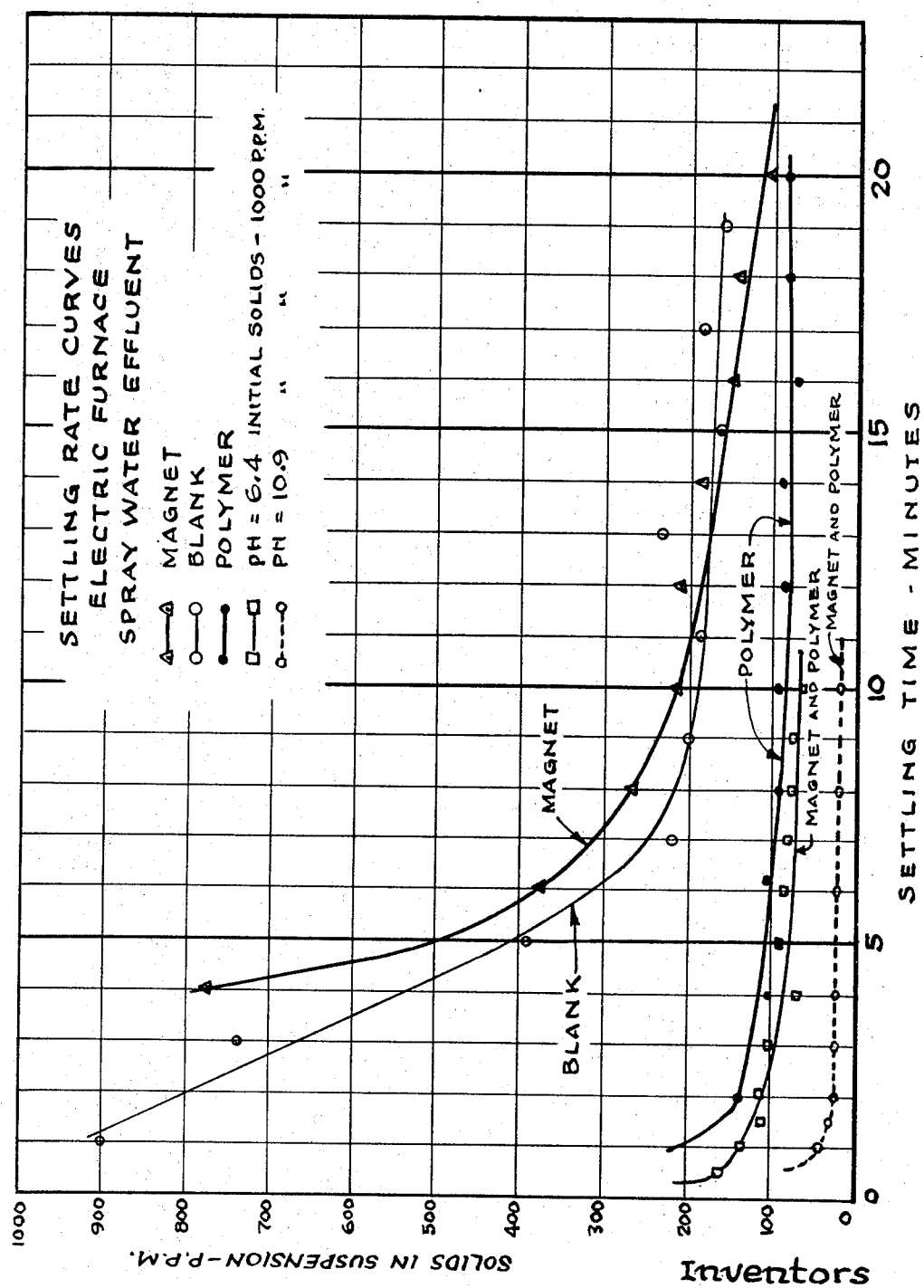
FIG. 5 is settling curves of an aqueous suspension of electric furnace dust which has been treated with a water soluble anionic polymer, a magnet and a combination of the anionic polymer and a magnet.

The results of the treatment of the electric furnace spray water effluent are given in FIG. 5. FIG. 5 gives a comparison of the settling rate of solids from suspension in the effluent where samples of the effluent were treated with a magnet, the polymer alone, and combination of magnet and polymer at two different pH levels. The settling rate of an untreated sample of the effluent is also shown on FIG. 5 for comparison purposes.

It can be seen that the drop from a level of solids in suspension of 1000 p.p.m. to a level of approximately 200 p.p.m. was accomplished in less than one minute where the magnet and polymer were used together. It can be seen from FIG. 5 that the results with the magnet and polymer show a great improvement over the results where the sample was untreated and the results where either the magnet or the polymer were used alone.

From the foregoing, it is evident that the invention provides a superior method of effectively clarifying aqueous suspensions of finely-divided ferromagnetic particles. Effluents resulting from the process of the invention are of sufficient quality that they may be often times recycled or emptied into receiving streams, rivers, and lakes without further treatment.

We therefore claim:

1. A method of clarifying aqueous fluid suspensions, the suspended phase of which is composed predominantly of finely divided iron oxide particles which result from an iron or steelmaking process susceptible to magnetic polarization, the ultimate particle size of which is less than $35\mu$ in at least one dimension which comprises the steps of:
    (1) first, adjusting the pH of said suspension to between 8 and 12;
    (2) subsequently, uniformly admixing the suspension with at least 0.01 p.p.m. of an anionic water soluble polymer formed by the polymerization of at least one mono-oleofinic compound through an aliphatic unsaturated group, and having a molecular weight of at least 100,000;
    (3) then, subjecting the polymer treated suspension to a magnetic field having a flux density of at least 10 gauss whereby the magnetically polarizable particles are formed into large agglomerated floc particles capable of rapidly settling; and,
    (4) finally, separating the flocculated particles from the aqueous fluid.

2. The method of claim 1 where the anionic water soluble polymer is composed of at least 10% by weight of at least one monomer which contains in a side chain a hydrophilic group selected from the class consisting of carboxylic acids, carboxylic acid anhydrides and carboxylic acid salt groups.

3. The method of claim 2 where the anionic water soluble polymer contains from 20–60% by weight of acrylic acid.

4. The method of claim 3 where the anionic water soluble polymer contains from 40–80% by weight of acrylamide.

5. The method of claim 3 where the anionic water soluble polymer is a polyacrylic acid polymer.

6. The method of claim 1 where the anionic water soluble polymer has a molecular weight of at least 1,000,000.

7. The method of claim 1 where the suspension contains from 10 p.p.m. to 30% by weight of iron oxide particles of the type formed from the manufacture of steel by the electric furnace process.

8. The method of claim 1 where the aqueous suspension contains finely divided particles of the type produced by the BOF process.

References Cited

UNITED STATES PATENTS

| | | | |
|---|---|---|---|
| 2,264,756 | 12/1941 | Johnston | 210—222X |
| 3,441,502 | 4/1969 | Tenorio | 210—49 |

FOREIGN PATENTS

| | | | |
|---|---|---|---|
| 731,212 | 3/1966 | Canada | 210—52 |

MICHAEL ROGERS, Primary Examiner

U.S. Cl. X.R.

210—223

PO-1050
(5/69)

UNITED STATES PATENT OFFICE
CERTIFICATE OF CORRECTION

Patent No. 3,549,527   Dated December 22, 1970

Inventor(s) David F. Peck et al

It is certified that error appears in the above-identified patent and that said Letters Patent are hereby corrected as shown below:

Column 1, line 4, "Woodbridge" should read -- Woodridge --.

Column 4, line 46, "peroffkite" should read -- peroffskite --

Column 6, line 21, "acid fumaric" should read -- acid, fumaric --.

Column 10, line 32, "havig" should read -- having --.

Signed and sealed this 30th day of March 1971.

(SEAL)
Attest:

EDWARD M. FLETCHER, JR.
Attesting Officer

WILLIAM E. SCHUYLER, JR
Commissioner of Patents